(12) United States Patent
Seo et al.

(10) Patent No.: US 7,487,722 B2
(45) Date of Patent: Feb. 10, 2009

(54) METHOD OF MANUFACTURING A DISPLAY PANEL WITH INK RECOVERY

(75) Inventors: Bong-Sung Seo, Yongin-si (KR);
Jeong-Uk Heo, Seongnam-si (KR);
Baek-Kyun Jeon, Yongin-si (KR);
Chung-Hyo Lee, Seoul (KR);
Byoung-Hun Sung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 258 days.

(21) Appl. No.: 11/488,423

(22) Filed: Jul. 18, 2006

(65) Prior Publication Data

US 2007/0022887 A1 Feb. 1, 2007

(30) Foreign Application Priority Data

Jul. 26, 2005 (KR) .................. 10-2005-0067752

(51) Int. Cl.
*B41F 9/16* (2006.01)

(52) U.S. Cl. .................. 101/170; 101/41; 101/169; 101/338

(58) Field of Classification Search .................. None
See application file for complete search history.

(56) References Cited

U.S. PATENT DOCUMENTS

| | | | | |
|---|---|---|---|---|
| 1,458,860 A | * | 6/1923 | Solomon .................. 101/167 |
| 5,343,803 A | * | 9/1994 | Duchek et al. .................. 101/170 |
| 5,603,263 A | * | 2/1997 | Dufour et al. .................. 101/167 |
| 2005/0028691 A1 | | 2/2005 | Baek .................. 101/41 |
| 2005/0211116 A1 | * | 9/2005 | Kumagai .................. 101/169 |
| 2007/0051257 A1 | * | 3/2007 | Heo et al. .................. 101/170 |

FOREIGN PATENT DOCUMENTS

| | | |
|---|---|---|
| JP | 06-218902 | 8/1994 |
| JP | 07-318718 | 12/1995 |
| JP | 08-072216 | 3/1996 |
| JP | 09-076465 | 3/1997 |
| JP | 2000-037857 | 2/2000 |
| JP | 2001-047613 | 2/2001 |
| JP | 2004-130788 | 4/2004 |
| KR | 100168227 | 10/1998 |
| KR | 10-2001-0015441 | 2/2001 |
| KR | 10-2003-0034975 | 5/2003 |
| KR | 10-2004-0060765 | 7/2004 |

* cited by examiner

*Primary Examiner*—Jill E. Culler
(74) *Attorney, Agent, or Firm*—F. Chau & Associates, LLC

(57) ABSTRACT

An apparatus for manufacturing a display panel includes a printing plate having a plurality of recesses formed on its surface and a hole formed at at least one end thereof, a transfer roller for receiving ink injected in the recesses, a supporting plate for supporting a substrate thereon, wherein the ink from the transfer roller is transferred onto the substrate according to a rotation of the roller, and an ink re-using unit positioned in the hole. Productivity can be improved by reducing a fabrication cost by provision of the ink re-using unit to re-use ink.

3 Claims, 8 Drawing Sheets

METHOD OF MANUFACTURING A DISPLAY PANEL WITH INK RECOVERY

CROSS-REFERENCE TO RELATED APPLICATION

This application claims priority to Korean Patent Application No. 10-2005-0067752 filed on Jul. 26, 2005, the contents of which are incorporated herein by reference in their entirety.

BACKGROUND OF THE INVENTION (a) Technical Field

The present disclosure relates to an apparatus for manufacturing a liquid crystal display (LCD).

(b) Discussion of the Related Art

An LCD is one of the most widely used flat panel displays. The LCD is a display device that may include two display panels each with an electric field generating electrode formed thereon and a liquid crystal layer interposed therebetween. Liquid crystal molecules of the liquid crystal layer are re-aligned by applying a voltage to the electrodes to thereby control transmittance of light that passes through the liquid crystal layer.

Upper and lower substrates of the LCD can be coupled together by a sealant which is formed on circumferential edges of the substrates. The sealant seals a liquid crystal material between the substrates. The upper and lower substrates can be supported by spacers provided therebetween to sustain a cell gap therebetween.

The spacers can be spherical bead spacers formed in an irregular pattern and column spacers formed in a uniform pattern.

The column spacers are formed in a desired pattern corresponding to portions of pixels where light is not transmitted, namely, for example, a channel portion, a gate line, a storage electrode line, or a light blocking member. The column spacers may be formed after coating a photosensitive film on a color filter array panel and then exposing and developing it.

The bead spacer forming method includes spreading the bead spacers irregularly. As a result of the bead spacer forming method, the bead spacers can act as foreign particles, thereby causing a light leakage that deteriorates the contrast ratio. Also, some bead spacers may undesirably move slightly to damage an alignment layer.

The column spacer forming method requires an additional photolithography process. As a result, a unit cost of a product increases. In addition the column spacers have a smaller elastic force than plastic bead spacers. As a result, a liquid crystal deposition amount margin is reduced to cause a filling deficiency or a smear deficiency when the spacer or a lower film is broken.

A color filter of a color filter array panel, the column spacer, or a light blocking member of the LCD can be fabricated by using a photolithography process. However, the necessity of performing many processes such as thin film coating, exposing, developing, and baking processes, and using many process facilities, are factors for increasing the unit cost of the LCD.

In order to fabricate the color filter array panel without performing the photolithography process, a roll printing process has been developed. However, when the roll printing process is performed, costly color filter ink, spacer ink, or light blocking member ink are not re-used in most cases.

SUMMARY OF THE INVENTION

An exemplary embodiment of the present invention provides an apparatus for manufacturing a liquid crystal display (LCD), including a printing plate having a plurality of recesses formed on its surface and a hole formed at at least one end thereof, a transfer roller for receiving ink injected into the recesses, and a supporting plate for supporting a substrate thereon, wherein ink from the surface of the transfer roller is transferred onto the substrate according to a rotation of the transfer roller; and an ink re-using unit provided at the hole.

The ink re-using unit may move up and down along the hole.

The apparatus for manufacturing an LCD may further include a blade for depositing ink into the recesses, and the blade may include a first blade for depositing ink into the recesses and a second blade for removing ink that has not been deposited into the recesses.

The first blade proceeds ahead of the second blade, and the second blade moves while in contact with the surface of the printing plate.

The apparatus for manufacturing an LCD further may further include an ink supply device for supplying ink to the printing plate, and the ink may be any one selected from spacer ink, light blocking member ink, color filter ink, and wiring ink.

The ink includes a thermosetting material or an ultraviolet hardener.

The recesses are arranged at certain intervals, and the ink applied to the surface of the transfer roller is spaced with the same intervals as that between the recesses.

Another embodiment of the present invention provides a method for manufacturing a liquid crystal display (LCD) including depositing ink on a printing plate that has a plurality of recesses formed on its surface and holes formed at both ends thereof, depositing the ink that has been deposited on the printing plate into the recesses by using blades, storing remaining ink in a first hole positioned at a first end of the printing plate, transferring ink from the recesses to a transfer roller, lifting an ink re-using unit installed at the first hole to position the remaining ink at a surface of the printing plate at the first end, and depositing the remaining ink into the recesses by using the blades.

The method for manufacturing an LCD may further include transferring the ink from the transfer roller to a substrate.

The method for manufacturing an LCD may further include depositing the remaining ink into the recesses and then storing further remaining ink in a second hole formed at a second end of the printing plate, transferring the remaining ink from the recesses to the transfer roller, and lifting the ink re-using unit installed at the second hole o to position the further remaining ink at a surface of the printing plate at the second end.

BRIEF DESCRIPTION OF THE DRAWINGS

Exemplary embodiments of the invention can be understood in more detail from the following descriptions taken in conjunction with the accompanying drawings in which.

DETAILED DESCRIPTION OF THE EMBODIMENTS

Embodiments of the present invention provide an apparatus and method for manufacturing a liquid crystal display (LCD) by which ink can be re-used.

Exemplary embodiments of the present invention will now be described more fully hereinafter in more detail with reference to the accompanying drawings. This invention may, however, be embodied in different forms and should not be construed as limited to the embodiments set forth herein.

Figure 1:
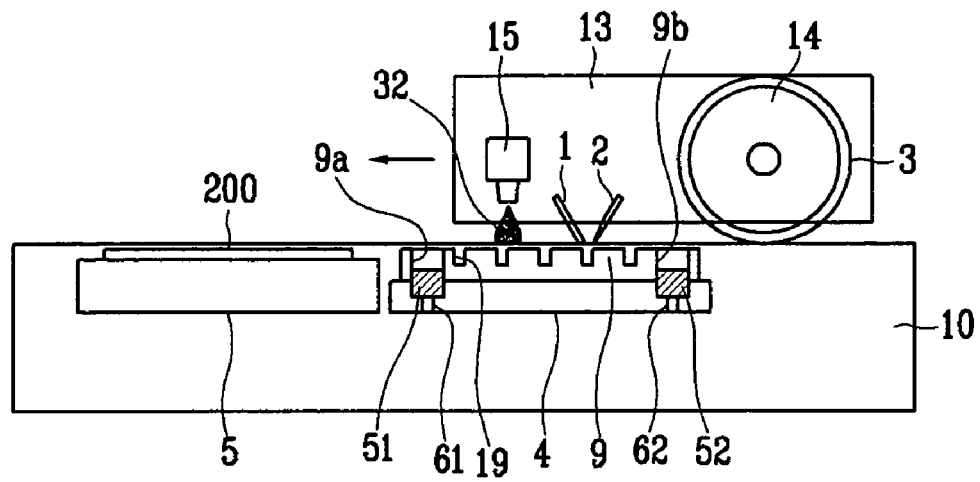
FIG. 1 is a diagram of an apparatus for manufacturing a liquid crystal display according to an exemplary embodiment of the present invention.
Figure 2:
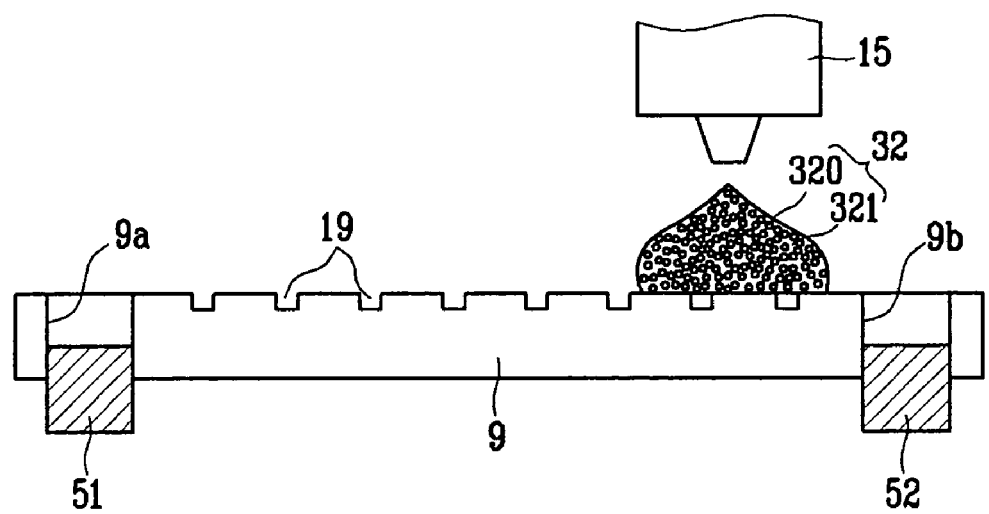
FIG. 2 is a view showing deposition of spacer ink on a printing plate according to an exemplary embodiment of the present invention.

FIG. 1 is a diagram showing an apparatus for manufacturing an LCD according to an exemplary embodiment of the present invention, and FIG. 2 is an enlarged view of a printing plate and an ink re-using unit.

As shown in FIGS. 1 and 2, the apparatus for manufacturing an LCD comprises a printing plate 9 having holes 9a and 9b formed at both ends thereof, a transfer roller 14, an ink supply device 15, a supporting plate 5 on which a display panel 200 is mounted, and ink re-using units 51 and 52 installed at the holes 9a and 9b of the printing plate 9.

The printing plate 9 and the supporting plate 5 are installed at a lower frame 10, and the transfer roller 14 and the ink supply device 15 are installed at an upper frame 13.

The printing plate 9 is installed on a printing prop 4 of the lower frame 10, and is made of, for example, glass, plastic, or a stainless steel (SUS) material. A plurality of recesses 19 are formed on a surface of the printing plate 9. The recesses 19 are formed by, for example, a photolithography method, a metal molding method, or a laser processing method. The recesses 19 can be formed in various patterns according to whether a color filter 230, spacers 320, or a light blocking member 220 is to be formed on the display panel 200. The recesses 19 are formed at the same intervals as an interval between spacers 320 to be formed on the display panel 200. The display panel 200, on which the spacers 320 are disposed, is mounted on the supporting plate 5.

The ink supply device 15 is separated by a distance from the printing plate 9, is positioned at an upper side of the printing plate 9, and deposits spacer ink 32 on the printing plate 9. The spacer ink 32 includes spacers 320 and a hardener 321. The spacers 320 are bead spacers that are made of an organic material with a low dielectric constant such as, for example, an acrylic organic compound, Teflon, benzocyclobutene (BCB), cytop, or perfluorocyclobutene (PFCB). The hardener 321 can be a thermosetting material or an ultraviolet hardener. The ink supply device 15 can deposit, for example, color filter ink, light blocking member link, or wiring ink on the printing plate 9.

A transfer sheet 3 made of, for example, hydrophilic silicon is attached to the surface of the transfer roller 14, and blades 1 and 2 are installed at a rear side of the ink supply device 15 to evenly inject the spacer ink 32 that has been deposited on the printing plate 9 into the plurality of recesses 19 of the printing plate 9.

The blades 1 and 2 include a first blade 1 for injecting ink 32 into the recesses 19 and a second blade 2 for removing ink 32 that has not been injected into the recesses 19. The first blade 1 proceeds ahead of the second blade 2 and injects ink 32 in the recesses 19. The first blade 1 does not contact the surface of the printing plate 9, while the second blade 2 moves while in contact with the surface of the printing plate 9 to remove ink 32 that has not been injected into the recesses 19.

The re-using units 51 and 52 move up and down along the holes 9a and 9b by means of lifters 61 and 62. The re-using units store ink 32 therein and supply stored remaining ink 32 onto the printing plate 9. The lifters 61 and 62 can be operated using, for example, a ball screw and a motor, or using a cylinder and hydraulic pressure, air pressure, or oil pressure.

A method for manufacturing an LCD by using the apparatus for manufacturing an LCD according to an exemplary embodiment of the present invention will now be described in detail.

Figure 3A:
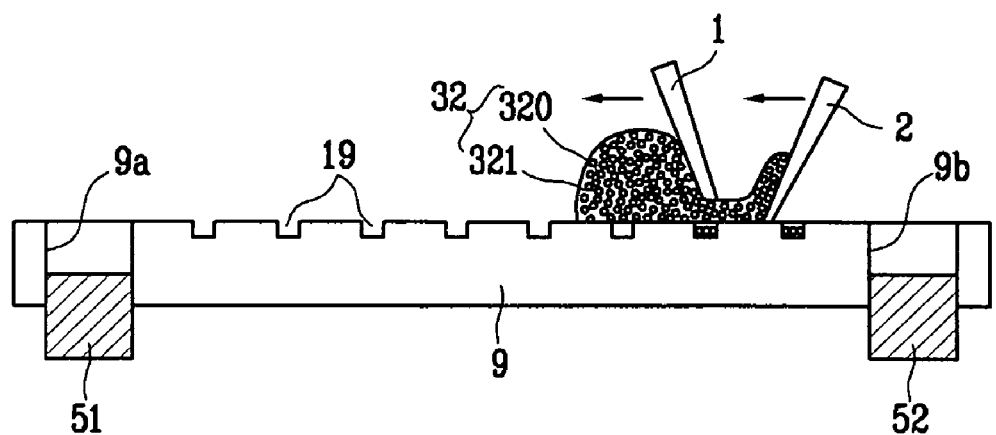
FIG. 3A is a view showing the spacer ink that has been deposited on the printing plate being injected evenly into a plurality of recesses by using blades according to an exemplary embodiment of the present invention.
Figure 3B:
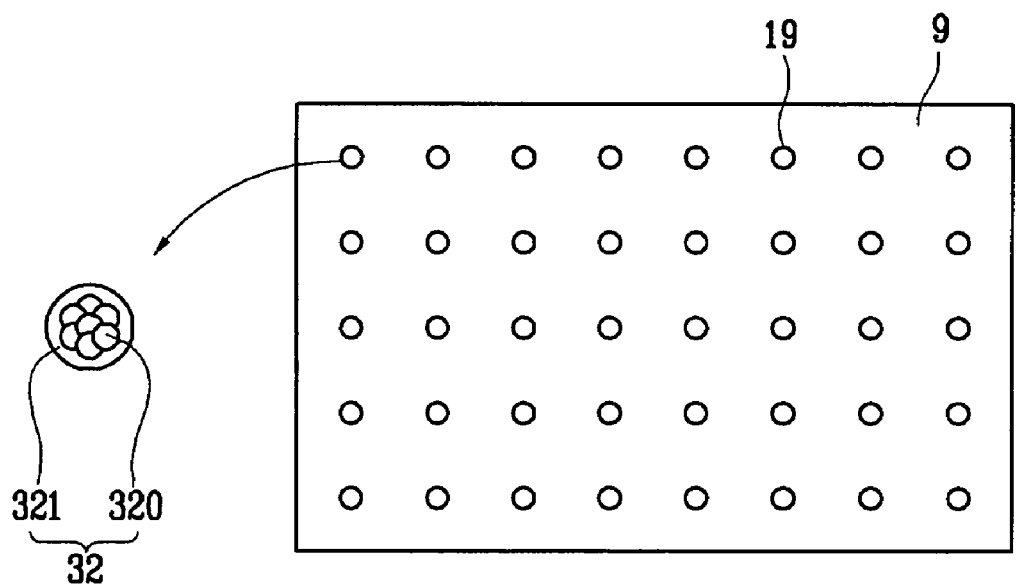
FIG. 3B is a top plan view showing a state in which the spacer ink has been injected into the recesses of the printing plate according to an exemplary embodiment of the present invention.
Figure 4:
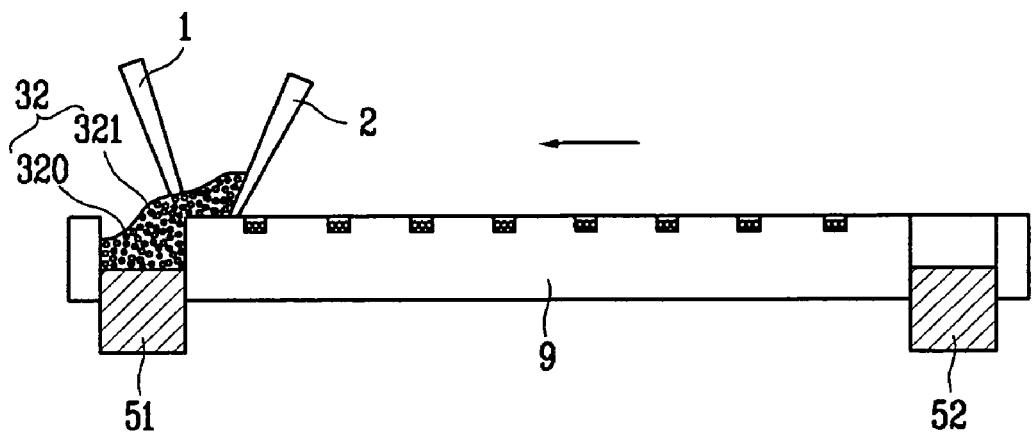
FIG. 4 is a view showing storing of the spacer ink in a spacer re-using unit provided at one end of the printing plate by using the blades according to an exemplary embodiment of the present invention.
Figure 5:
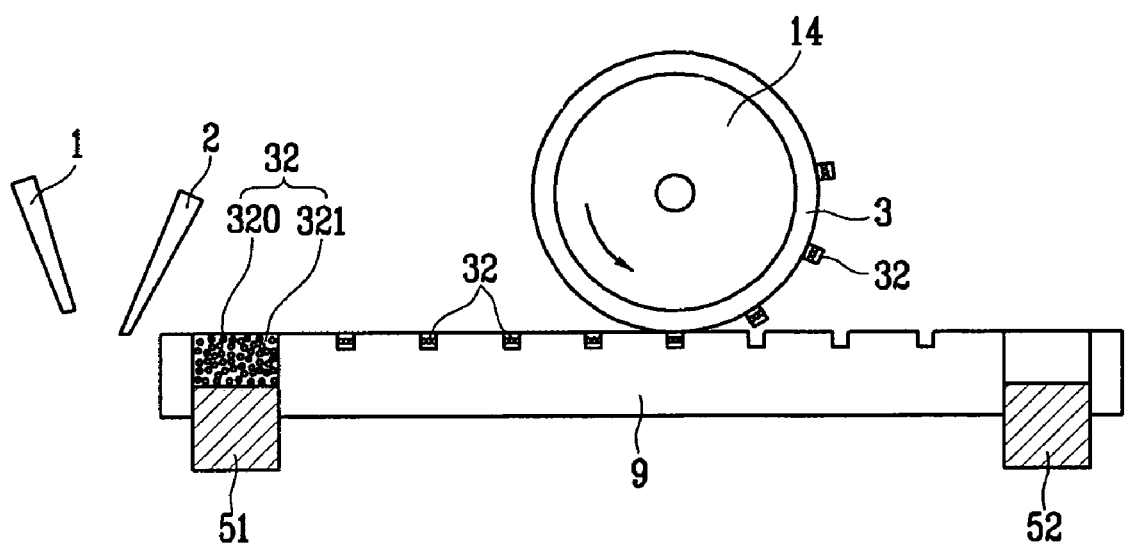
FIG. 5 is a view showing a state in which the spacer ink is transferred from the printing plate to a surface of a transfer roller according to an exemplary embodiment of the present invention.
Figure 6:
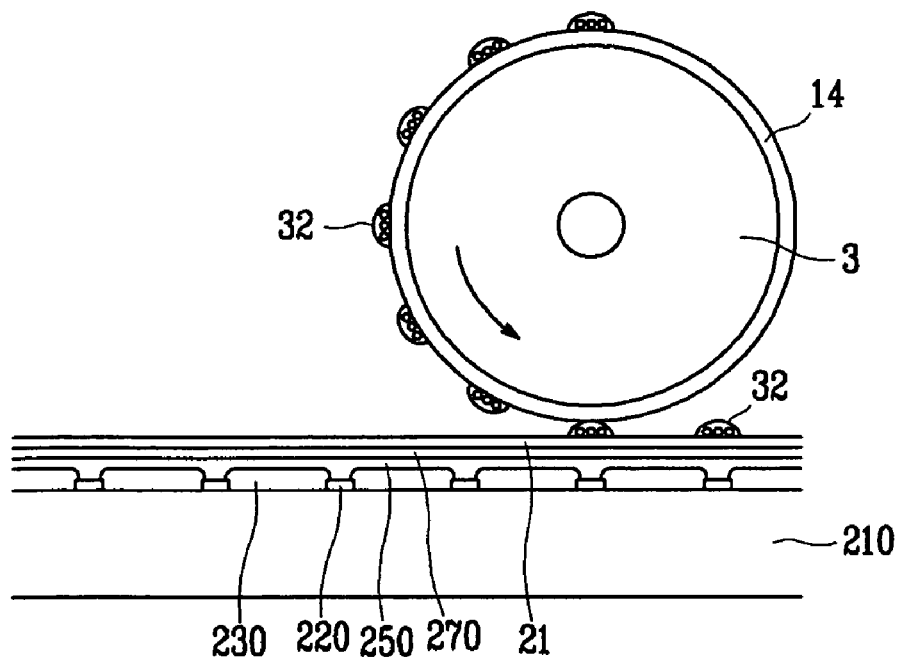
FIG. 6 is a view showing a state in which the spacer ink applied on the surface of the transfer roller is transferred onto a display panel according to an exemplary embodiment of the present invention.
Figure 7:
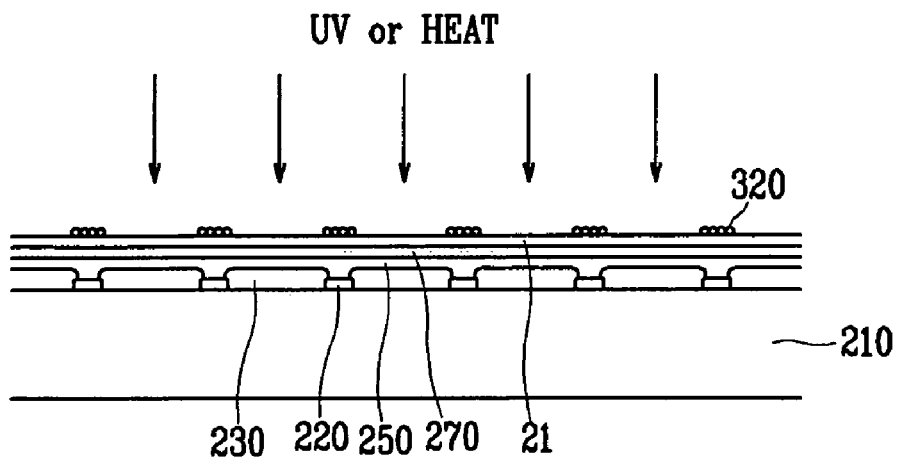
FIG. 7 is a view showing a state in which the spacer ink transferred to the display panel is hardened so as to be formed as spacers according to an exemplary embodiment of the present invention.
Figure 8:
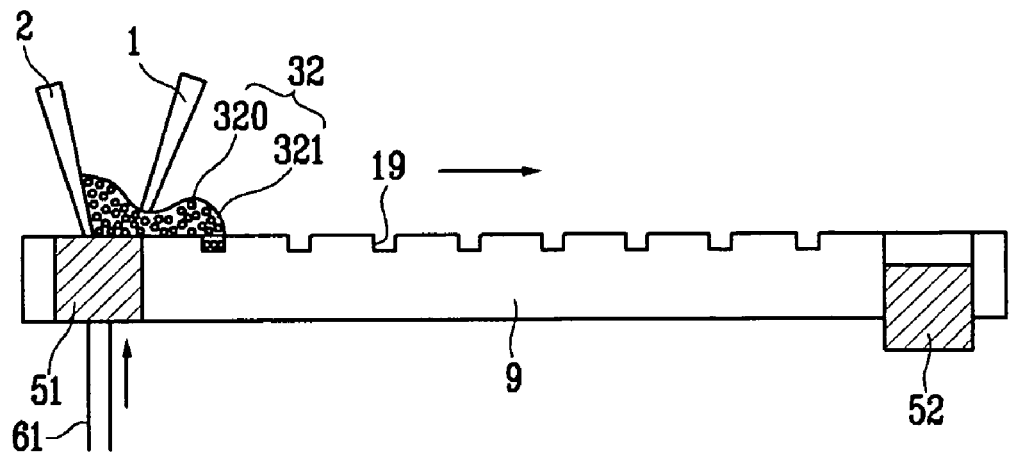
FIG. 8 is a view showing positioning of the spacer ink on one end of the printing plate by using the spacer re-using unit according to an exemplary embodiment of the present invention.
Figure 9:
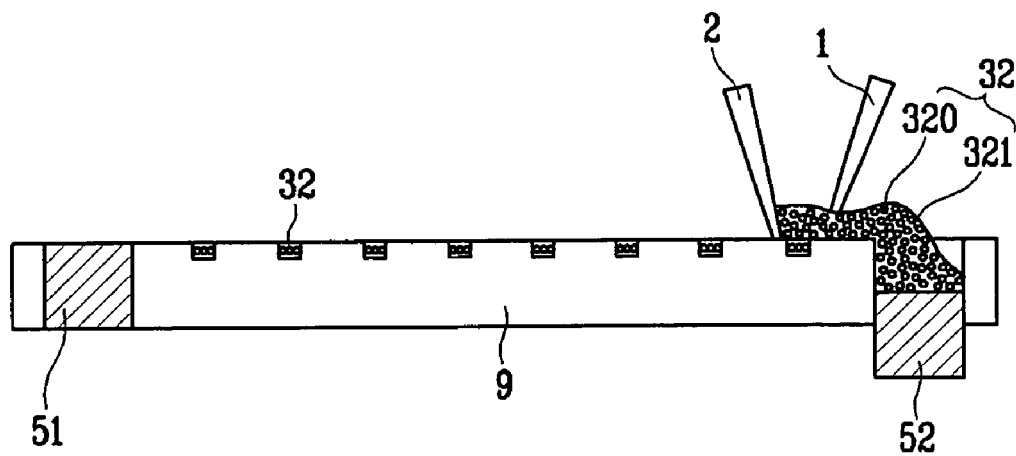
FIG. 9 is a view showing re-injection of the spacer ink positioned on the printing plate into the plurality of recesses by using the blades according to an exemplary embodiment of the present invention.
Figure 10:
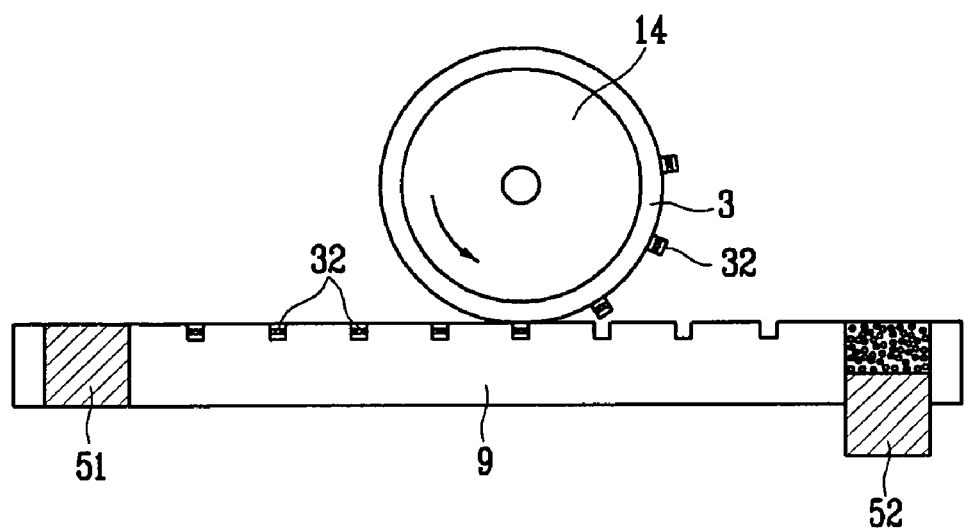
FIG. 10 is a view showing a state in which the spacer ink is transferred again onto the surface of the transfer roller from the printing plate according to an exemplary embodiment of the present invention.
Figure 11:
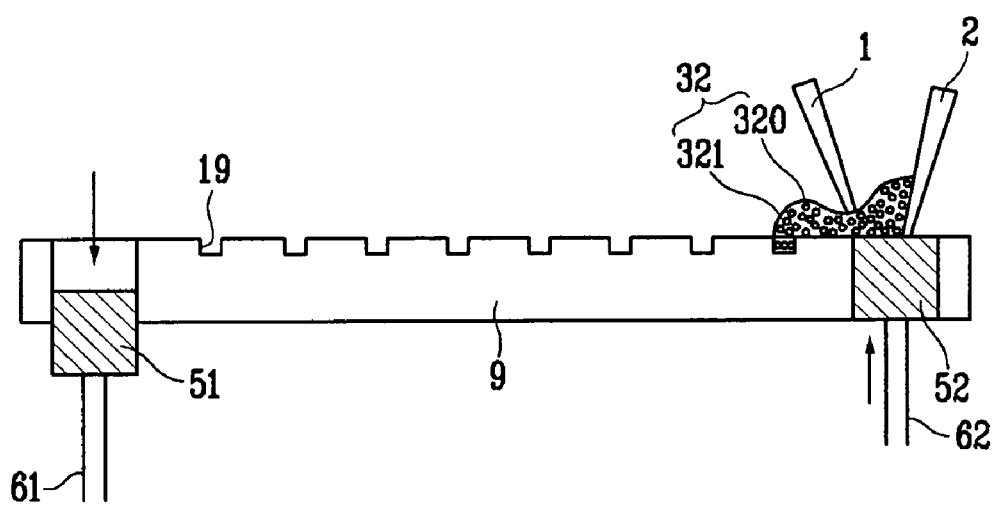
FIG. 11 is a view showing positioning of the spacer ink on the other end of the printing plate by using the spacer re-using unit according to an exemplary embodiment of the present invention.

FIG. 3A is a view showing even injecting of the spacer ink that has been deposited on the printing plate into a plurality of recesses by using blades. FIG. 3B is a top plan view showing a state in which spacer ink has been injected into the recesses of the printing plate, and FIG. 4 is a view showing storing of spacer ink in a spacer re-using unit provided at one end of the printing plate by using the blades. FIG. 5 is a view showing a state in which spacer ink is transferred from the printing plate to a surface of a transfer roller. FIG. 6 is a view showing a state in which spacer ink applied to the surface of the transfer roller is transferred onto a display panel. FIG. 7 is a view showing a state in which spacer ink that is transferred to the display panel is hardened so as to be formed as spacers, and FIG. 8 is a view showing positioning of spacer ink on one end of the printing plate by using the spacer re-using unit. FIG. 9 is a view showing re-injection of spacer ink positioned on the printing plate into the plurality of recesses by using the blades. FIG. 10 is a view showing a state in which spacer ink is again transferred onto the surface of the transfer roller from the printing plate, and FIG. 11 is a view showing positioning of the spacer ink on the other end of the printing plate by using the spacer re-using unit.

As shown in FIG. 2, the spacer ink 32 is deposited onto the printing plate 9 by using the ink supply device 15. For example, color filter ink, light blocking member ink, or wiring ink can be deposited. The spacer ink 32 includes the plurality of spacers 320 and includes, for example, the thermosetting material or the ultraviolet hardener 321.

Next, as shown in FIG. 3A, the spacer ink 32 is injected into the plurality of recesses 19 formed on the printing plate 9 by using the blades 1 and 2. The first blade 1, which proceeds ahead of the second blade 2, pushes the ink 32 into the recesses 19, and the second blade 2, which moves while in contact with the surface of the printing plate 9, removes the ink 32 that has not been injected into the recesses. As shown in FIG. 3B, the plurality of spacers 320 are injected together with the hardener 321 into the recesses 19.

Next, as shown in FIG. 4, the remaining ink 32 is removed and stored in the ink re-using unit 51 in hole 9a formed at one end of the printing plate 9 by using the first and second blades 1 and 2.

Then, as shown in FIG. 5, as the transfer roller 14 is rotated, the spacer ink 32 is transferred onto a surface of a transfer sheet 3 of the transfer roller 14. The spacer ink 32 is attached to the surface of the transfer sheet 3 at the same intervals as those between the recesses 19.

Thereafter, as shown in FIG. 6, the transfer roller 14 with the plurality of sets of spacer ink 32 attached to the surface thereof is moved onto the supporting plate 5 and transfers the sets of spacer ink 32 onto the display panel 200 mounted on the supporting plate 5. Accordingly, the spacer ink 32 is arranged at uniform intervals and at certain positions on the display panel 200.

FIG. 6 shows the state in which the spacer ink 32 is transferred onto the display panel 200 including an insulation substrate 210 on which the light blocking member 220, the color filter 230, an overcoat 250, a common electrode 270, and an alignment layer 21 have been sequentially formed. Alternatively, the spacer ink 32 can be transferred before the alignment layer 21 is formed. By precisely arranging the spacers 320 on regions corresponding to the light block members 220, light leakage can be prevented.

Subsequently, as shown in FIG. 7, the spacers 320 that have been transferred together with the thermosetting material or the ultraviolet hardener 321 are hardened by, for example, heat or ultraviolet rays so as to be firmly attached to the display panel 200. The upper panel 200 including the spacers 320 arranged thereon is positioned opposite a lower panel 100, and pressure is applied to the upper panel 200 so as to attached the upper panel 200 to the lower panel 100 (refer to FIG. 13).

Referring to FIG. 8, after the spacer ink 32 is attached on the display panel 200, the ink re-using unit 51 installed at the hole 9a is lifted by using the lifter 61. Then, the remaining ink 32 is re-supplied onto one end of the printing plate 9.

Thereafter, as shown in FIG. 9, the remaining ink 32 is deposited into the recesses 19 by using the first and second blades 1 and 2. After the remaining ink 32 is deposited into the recesses 19, the remaining ink 32 is stored in the re-using unit 52 provided in hole 9b formed at the other end of the printing plate 9.

Then, as shown in FIG. 10, when the transfer roller 14 is rotated, the spacer ink 32 is transferred onto the surface of the transfer sheet 3 of the transfer roller 14.

Thereafter, as shown in FIG. 11, the ink re-using unit 52 installed at the hole 9b is lifted by using the lifter 62. Accordingly, the remaining ink 32 is re-supplied to the other end of the printing plate 9. The remaining ink 32 can then be deposited into the recesses 19 on the printing plate 9 by using the blades 1 and 2. The ink re-using unit 51 installed at the hole 9a at one end of the printing plate 9 is then lowered down by using the lifter 61 to prepare for a following process.

In this manner, the ink 32 can be continuously supplied onto the printing plate 9 by using the ink re-using units 51 and 52, so the fabrication cost can be reduced.

Figure 12:
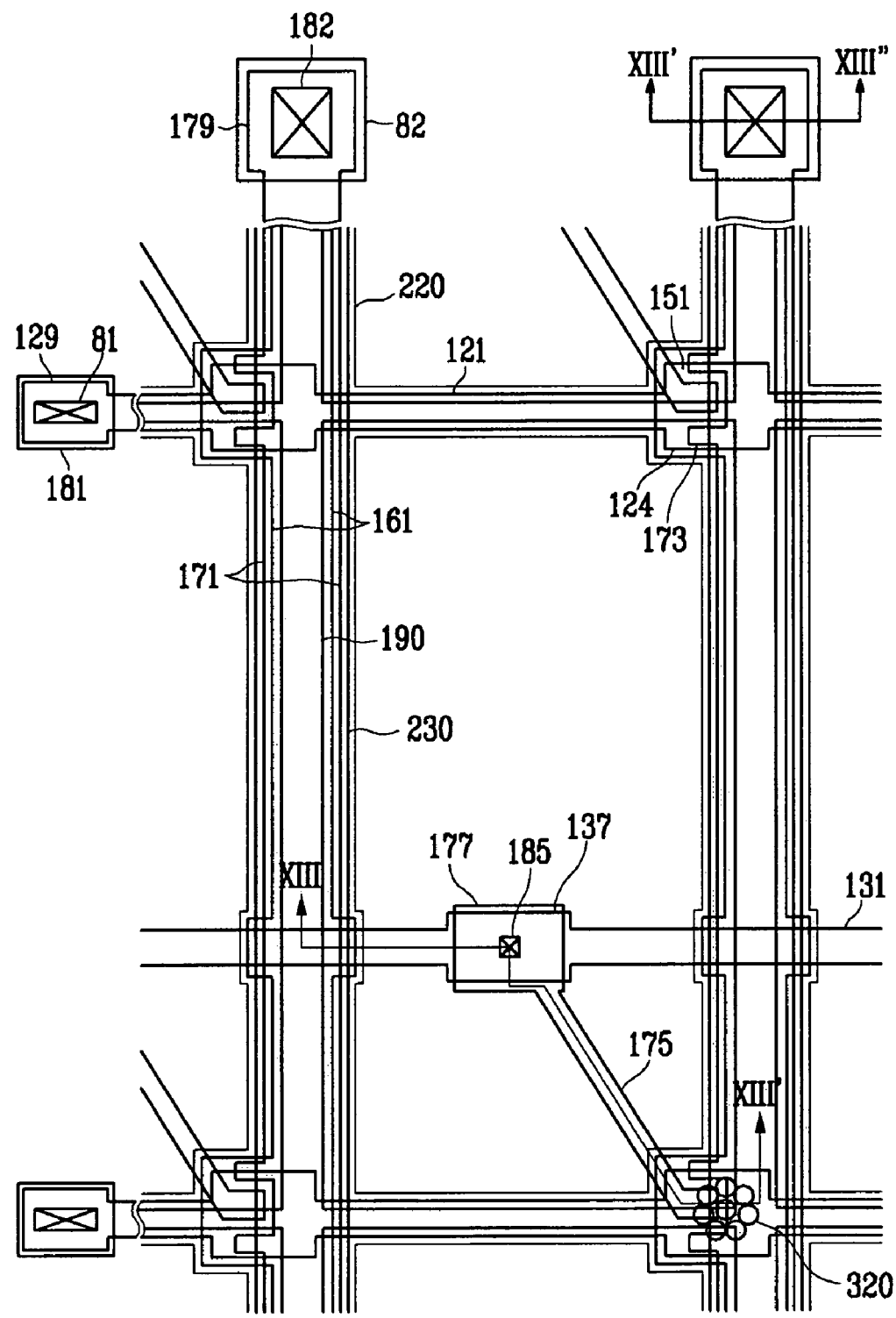
FIG. 12 is a layout view of a thin film transistor array panel on which the spacers have been formed by the apparatus for manufacturing the LCD according to an exemplary embodiment of the present invention.
Figure 13:
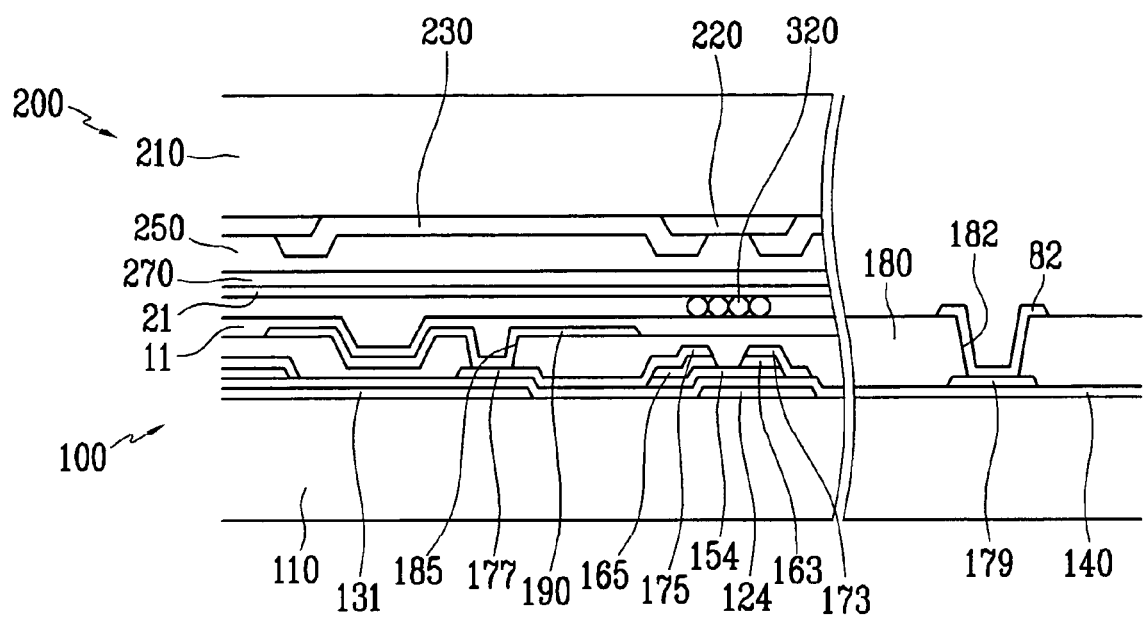
FIG. 13 is a cross-sectional view taken along line XIII-XIII'-XIII'' of the thin film transistor array panel in FIG. 12.

FIG. 12 is a layout view of a thin film transistor array panel on which the spacers have been formed by the apparatus for manufacturing the LCD according to an exemplary embodiment of the present invention, and FIG. 13 is a cross-sectional view taken along line XIII-XIII'-XIII" of the thin film transistor array panel in FIG. 12.

A plurality of gate lines 121 and a plurality of storage electrode lines 131 are formed on an insulation substrate 110 made of, for example, transparent glass or plastic.

Each gate line 121 transfers a gate signal, and mainly extends in a horizontal direction. Each gate line 121 comprises a plurality of gate electrodes 124 protruding therefrom, for example, in up and down directions, and a portion 129 with a large area for connection with a different layer or an external driving circuit. A gate driving circuit (not shown) for generating a gate signal can be mounted on a flexible printed circuit film (not shown) attached on the substrate 110, can be directly mounted on the substrate 110, or can be integrated with the substrate 110. In the case where the gate driving circuit is integrated with the substrate 110, the gate line 121 can be elongated to be directly connected therewith.

Each storage electrode line 131 receives a predetermined voltage and extends to be substantially parallel to the gate lines 121. Each storage electrode line 131 is positioned between two adjacent gate lines 121, and is closer to the one of the two gate lines 121. The storage electrode line 131 includes a storage electrode 137 that is elongated, for example, in upward and downward directions. It is to be understood that the gate line 121 and the storage electrode line 131 can be modified into various shapes and dispositions.

The gate line 121 and the storage electrode line 131 can include, for example, an aluminum group metal such as aluminum (Al) or an aluminum alloy, a silver group metal such as silver (Ag) or a silver alloy, a copper group metal such as copper (Cu) or a copper alloy, a molybdenum group metal such as molybdenum or a molybdenum alloy, chromium (Cr), tantalum (Ta), and/or titanium (Ti). The gate line 121 and the storage electrode line 131 can have a multi-layer structure including two conductive layers (not shown) each having different physical properties. One of the two conductive layers is made of a metal with low resistivity, for example, the aluminum group metal, the silver group metal or the copper group metal, to reduce a signal delay or a voltage drop.

Another one of the two conductive layers is made of a material, such as a molybdenum group metal, chromium, tantalum, or titanium, that exhibits excellent physical, chemical, and electrical contact characteristics with a different material, for example with ITO (Indium Tin Oxide) and IZO (Indium Zinc Oxide). Examples of good combinations may include a combination of a chromium lower film and an aluminum (alloy) upper film, and a combination of an aluminum (alloy) lower film and a molybdenum (alloy) upper film. It is to be understood that the gate line 121 and the storage electrode line 131 can be made of various other metals or conductors.

The sides of the gate lines 121 and the sides of the storage electrode lines 131 are sloped with respect to the surface of the substrate 110, and the slope angle is about 30° to about 80°.

A gate insulation layer 140 made of, for example, silicon nitride (SiNx) or silicon oxide (SiOx), is formed on the gate lines 121 and the storage electrode lines 131.

A plurality of semiconductor stripes 151 made of, for example, hydrogenated amorphous silicon (a-Si) or polycrystalline silicon, are formed on the gate insulation layer 140. The semiconductor stripes 151 mainly extend in a vertical direction and include a plurality of projections 154 projected toward the gate electrode 124. The semiconductor stripes 151 increase in width near the gate lines 121 and the storage electrode lines 131 to cover the gate and storage electrode lines 121, 131.

A plurality of ohmic contact stripes 161 and a plurality of islet-type ohmic contacts 165 are formed on the semiconductor stripes 151. The ohmic contact stripes 161 and the islet-type ohmic contacts 165 can be made of a material such as silicide, or n+ hydrogenated amorphous silicon in which an n-type impurity such as phosphor is doped with a high density. The ohmic contact stripes 161 include a plurality of projections 163, and a projection 163 and an islet-type ohmic contact 165 are arranged as a pair on a projection 154 of each semiconductor stripe 151.

The sides of the semiconductor stripes 151 and the sides of the ohmic contacts 161 and 165 are also sloped with respect to the surface of the substrate 110, and the slope angle is about 30° to about 80°.

A plurality of data lines 171 and a plurality of drain electrodes 175 are formed on the ohmic contacts 161 and 165 and the gate insulation layer 140.

Each data line 171 transfers a data signal and mainly extends in a vertical direction to cross the gate lines 121 and the storage electrode lines 131. Each data line 171 includes a plurality of source electrodes 173 extending toward the gate electrodes 124 and an end portion 179 with a wide area for connection with a different layer or an external driving circuit. A data driving circuit (not shown) for generating a data signal can be mounted on a flexible printed circuit film (not shown) attached on the substrate 110, can be directly mounted on the substrate 110, or can be integrated with the substrate 110. In the case where the data driving circuit is integrated with the substrate 110, the data line 171 can be elongated to be connected therewith.

Each drain electrode 175 is separated from the data line 171 and faces the source electrode 173. The opposing source and drain electrodes 173, 175 can be centered about the gate electrode 124. Each drain electrode 175 includes one end portion which is large and the other end portion which has a bar shape. The large end portion overlaps with the storage electrode 137, and the bar-shaped end portion is partially surrounded by a bent source electrode 173.

One gate electrode 124, one source electrode 173, and one drain electrode 175 constitute a thin film transistor (TFT) together with the protrusion 154 of the semiconductor stripe 151. A channel of the TFT is formed at the projection 154 between the source electrode 173 and the drain electrode 175.

The data line 171 and the drain electrode 175 can be made of a refractory metal such as molybdenum, chromium, tantalum, or titanium, or alloys thereof, and can have a multi-layer structure including a refractory metal film (not shown) and a low-resistance conductive layer (not shown). Examples of the multi-layer structure can include a double-layer of a chromium or molybdenum (alloy) lower film and an aluminum (alloy) upper film, and a triple-layer of a molybdenum (alloy) lower film, an aluminum (alloy) intermediate layer, and a molybdenum (alloy) upper film. It is to be understood that the data line 171 and the drain electrode 175 can be modified into various shapes and dispositions and made of various other metals or conductors.

The sides of the data lines 171 and the sides of the drain electrodes 175 can be sloped with respect to the surface of the substrate 110 at a slope angle of about 30° to about 80°.

The ohmic contacts 161 and 165 exist between the lower semiconductor stripe 151 and the upper data line 171 and the drain electrode 175 to lower contact resistance therebetween. Most portions of the semiconductor stripes 151 are narrower than the data lines 171, but as aforementioned, the portion of a semiconductor stripe 151 that meets a gate line 121 has a large width, thereby smoothing a profile of the surface, so disconnection of the data line 171 can be prevented. Some portions of the semiconductor stripes 151, for example, a portion between the source electrode 173 and the drain electrode 175, are exposed without being covered by the data line 171 and the drain electrode 175.

A passivation layer 180 is formed on the data lines 171, the drain electrodes 175, and the exposed portions of the semiconductor stripe 151. The passivation layer 180 is made of, for example, an inorganic insulator or an organic insulator, and can have a planarized surface.

Examples of the inorganic insulator are silicon nitride and silicon oxide. The organic insulator can have photosensitivity, and its dielectric constant is preferably not greater than about 4.0. In this respect, the passivation layer 180 can also have a dual-layer structure of a lower inorganic film and an upper organic film so that it may protect the exposed portion of the semiconductor stripe 151 while still sustaining the excellent insulation characteristics of the organic film.

At the passivation layer 180, there are formed a plurality of contact holes 182 and 185 exposing the end portions 179 of the data lines 171 and the drain electrodes 175, respectively. A plurality of contact holes 181 exposing the end portions 129 of the gate lines 121 are formed at the passivation layer 180 and the gate insulating layer 140.

A plurality of pixel electrodes 190 and a plurality of contact assistants 81 and 82 are formed on the passivation layer 180. The pixel electrodes 190 and the contact assistants 81 and 82 can be made of a transparent conductive material such as ITO or IZO, or a reflexive metal such as aluminum, silver, chromium, or their alloys.

The pixel electrodes 190 are physically and electrically connected with the drain electrodes 175 through the contact holes 185, and receive a data voltage from the drain electrodes 175. Upon receiving the data voltage, each pixel electrode 190 generates an electric field together with a common electrode 270 of a different display panel which receives a common voltage, to thereby determine a direction of liquid crystal molecules of a liquid crystal layer between the two electrodes. Polarization of light which transmits through the liquid crystal layer can be varied according to the determined direction of the liquid crystal molecules. A pixel electrode 190 and the common electrode 270 form a capacitor (referred to hereinafter as 'liquid crystal capacitor') to sustain the applied voltages even after the TFT is turned off.

The pixel electrode 190 and the drain electrode 175 connected thereto overlap with the storage electrode line 131. A capacitor comprising the pixel electrode 190 and the drain electrode 175 electrically connected to the pixel electrode 190 overlapping with the storage electrode line 131 is called a storage capacitor, and the storage capacitor strengthens a voltage sustaining capability of the liquid crystal capacitor.

The contact assistants 81 and 82 are connected with the end portion 129 of the gate line 121 and the end portion 179 of the data line 171 through the contact holes 181 and 182, respectively. The contact assistants 81 and 82 complement bonding characteristics of the end portions 129 of the gate lines 121 and the end portions 179 of the data lines 171 with external devices, and protect the end portions 129, 179.

A lower alignment layer 11 for determining alignment of liquid crystals is formed on the pixel electrode 190.

A common electrode panel will now be described in detail with reference to the accompanying drawings.

An insulation substrate 210 made of, for example, transparent glass or plastic is positioned at an upper portion of the lower alignment layer 11, spaced apart by an interval from the lower alignment layer 11. A light blocking member 220 such as a black matrix for dividing pixel areas is formed in a matrix form on the insulation substrate 210. Color filters, for example, a red filter, a green filter, and a blue filter, which represent three primary colors required for displaying an image, are formed between the light blocking members 220 such that color filters partially overlap the light blocking members 220.

The red, green, and blue filters can be formed in a stripe form, or can be formed separately for each pixel.

An overcoat 250 is formed on the light blocking member 220 and the color filter 230 to protect light blocking member 220 and the color filter 230. The overcoat 250, which can be made of, for example, an organic insulator, prevents the color filter 230 from being exposed and provides a planarized surface. The overcoat 250 can be omitted.

The common electrode 270, which is made of a transparent conductor, such as ITO or IZO, and which forms an electric field together with the pixel electrode 190, is formed on the overcoat 250. An upper alignment layer 21 is formed on the common electrode 270.

The plurality of spacers 320 are collectively positioned on a portion of the upper alignment layer 21 corresponding to the light blocking member 220. The plurality of spacers 320 form a uniform cell gap and increase elastic force to thereby prevent a smear deficiency that can be easily caused when pressure is applied to the display panel 200.

The apparatus and method for manufacturing an LCD according to the exemplary embodiments of the present invention can improve productivity by reducing fabrication cost by installing the ink re-using unit to re-use ink.

In the above-described embodiments, the liquid crystal display is used, but the present invention is not limited thereto. For example, the present invention may be applied to various display devices, such as a plasma display device and an OLED display.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for manufacturing a display panel, comprising:
    depositing ink on a printing plate including a plurality of recesses formed on a surface thereof and holes formed at both ends thereof;
    depositing the ink that has been deposited on the printing plate into the recesses by using blades;
    storing remaining ink in a first hole positioned at a first end of the printing plate;
    transferring the ink from the recesses to a transfer roller;
    lifting an ink re-using unit installed at the first hole where the remaining ink is stored to position the remaining ink on the first end of the printing plate; and
    depositing the remaining ink into the recesses by using the blades.

2. The method of claim 1, further comprising transferring the ink from the transfer roller to a substrate.

3. The method of claim 1, further comprising:
    depositing the remaining ink into the recesses and then storing further remaining ink in a second hole positioned at a second end of the printing plate;
    transferring the remaining ink from the printing plate to the transfer roller; and
    lifting an ink re-using unit installed at the second hole where the further remaining ink is stored to position the further remaining ink on the second end of the printing plate.

* * * * *